United States Patent [19]
McCarter

[11] 3,745,810
[45] July 17, 1973

[54] APPARATUS FOR MEASURING THE RATE AT WHICH VAPORS ARE EVOLVED FROM MATERIALS DURING THERMAL DEGRADATION

[75] Inventor: Robert J. McCarter, Derwood, Md.

[73] Assignee: The United States of America as represented by the Secretary of Commerce

[22] Filed: Sept. 3, 1971

[21] Appl. No.: 177,725

[52] U.S. Cl. .................................. 73/15 R, 73/25
[51] Int. Cl. ............................................ G01n 25/00
[58] Field of Search........................ 73/15, 23.1, 25, 73/27; 23/253

[56] References Cited
UNITED STATES PATENTS
3,055,206   9/1972   Watson et al............................ 73/15

Primary Examiner—Herbert Goldstein
Attorney—David Robbins and Alvin J. Englert

[57] ABSTRACT

A sample of the material to be analyzed is placed in a tube of inert material. A source of pressurized inert carrier gas is connected to one end of the tube and a mass flow rate meter is connected to the other end. The sample is heated by a furnace and its temperature is measured. A cracking coil operated at orange heat in the tube between the sample and the meter cracks any condensable or tarry vapors evolved from the sample. This prevents any vapors that otherwise might condense in conduit lines from fouling the apparatus, and from failing to be included in measurements of the vapor mass flow rate.

8 Claims, 2 Drawing Figures

PATENTED JUL 17 1973

3,745,810

APPARATUS FOR MEASURING THE RATE AT WHICH VAPORS ARE EVOLVED FROM MATERIALS DURING THERMAL DEGRADATION

BACKGROUND OF THE INVENTION

This invention relates to thermal analysis apparatus and more particularly to an apparatus for measuring the rate at which vapors are evolved from materials during thermal degradation.

The behavior of a material undergoing thermal degradation (pyrolysis or combustion) is commonly studied by recording the weight of a sample during the reaction. The accurate weighing of a sample in a furnace is difficult, however, due to effects such as mechanical reaction to evolved vapors, disturbances from convective flow of gases in the system, and distortion of the measurements by "thermomolecular flow," a phenomena that may occur when there are temperature differences within the weighing mechanism. These effects increase as the furnace heating rate is increased. In many cases, the temperature sensing device cannot be put in direct contact with the sample, so that measurement accuracy is lost. Or conversely, if the sensing device is within the sample, the added complications extract a penalty in the sensitivity of the measurements. This makes it especially difficult to accurately analyze pyrolysis reactions at rates approximating those commonly occurring during combustion and under circumstances where measurements are more useful.

SUMMARY OF THE INVENTION

This invention avoids the problems encountered in thermogravimetric analysis by recording, not the weight loss of a sample, but the rate at which the vapors are evolved from it. There are several types of mass flow rate meters which can measure this quantity with acceptable accuracy. The invention is simple in construction and use. Furthermore, its accuracy is not seriously degraded if considerably higher sample heating rates are used than those practical with prior devices. The invention permits a flexibility in its operation that often allows a definition of reactions not attainable with prior devices.

DETAILED DESCRIPTION OF THE INVENTION

Figure 1:
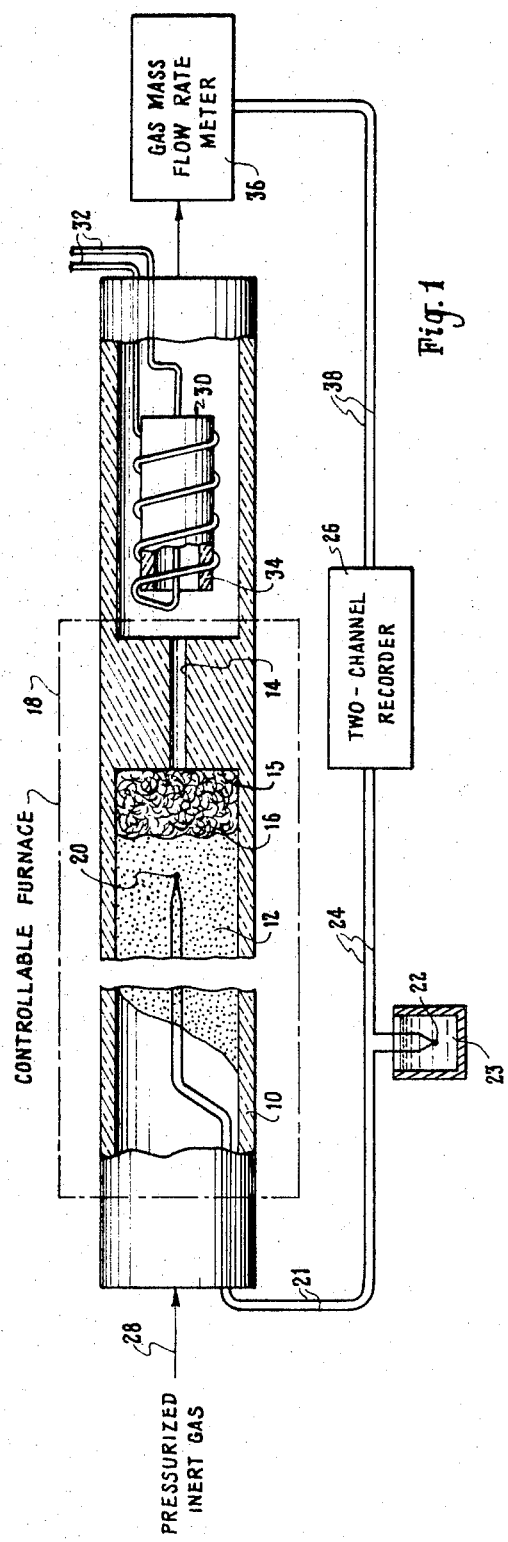
FIG. 1 is a cross-sectional view, schematic in parts, of the apparatus.

As shown in FIG. 1, the invention includes a long tube 10 of inert material such as quartz for holding a sample 12 of the material to be studied. The sample 12 usually is in finely divided form to increase its surface area, though it may be in coarse or lump form if desired. It also may be liquid or may melt before pyrolyzing; in these cases it may be held in a boat (not shown) of suitable material such as quartz or metal or retained on a plug of inert fibers such as glass wool.

To assist in loading and retaining a sample 12 in the tube 10, the inner diameter of the tube preferably is reduced for a short length as shown at 14, to provide a retaining shoulder 15. A plug of inert fibers 16, such as glass wool, may be placed on the shoulder 15 to prevent powdered or pulverized samples from passing into the small-bore section 14.

The part of tube 10 containing the sample 12 and small-bore section 14 is mounted in a long furnace 18 whose temperature-rise can be controlled or programmed as desired. Conveniently the furnace 18 is a tubular electrical resistance device connected by a variable autotransformer to the usual 60-Hz line (not shown). The furnace could also be a radiant energy source (not shown) when fast changes in temperature are desired.

The temperature of the sample 12 is measured by any suitable device such as a thermocouple 20 in intimate contact with the sample. The thermocouple leads 21 are brought out of tube 10 and connected in series with a cold junction 22 immersed in an ice bath 23 or other comparable device (not shown). The remaining leads 24 are connected to any suitable potentiometric device, such as one channel of a standard two-channel potentiometric recorder 26.

A source of pressurized inert gas 28 is connected to the tube 10 to carry the vapors evolved from the sample through the tube. The small-bore section 14 has a small volume and thus minimizes the delay in transit of vapors to the meter 36. The section also tends to thermally isolate the sample (heated at a controlled rate by furnace 18) from a cracking coil 30 operated at orange heat in the outlet end of tube 10.

The cracking coil 30 consists of a length of electrical resistance wire 32 such as Nichrome would around a small refractory tube 34. The tube 34 may be porcelain, alumina, etc. The ends of wire 32 are brought out of tube 10 and are connected to the power line (not shown) through a variable autotransformer if desired. The cracking coil at orange heat reduces (pyrolyzes) condensable and/or tarry vapors evolved from the sample 12 into noncondensable forms. This prevents the vapors from condensing during transit to the meter 36 (if condensed they would be unavailable for measurement) and from fouling the apparatus.

Connected to the outlet end of tube 10 is any suitable meter 36 for measuring the mass flow rate of the pyrolyzed vapors. The meter 36 could be, for example, a linear mass flowmeter or other flowmeter, continuous gas analyzer, thermal conductivity cell, electron capture detector, hydrogen flame detector, or combustible gas detector. Preferably the meter provides a voltage output, which is conducted by leads 38 to the second channel of recorder 26.

Figure 2:
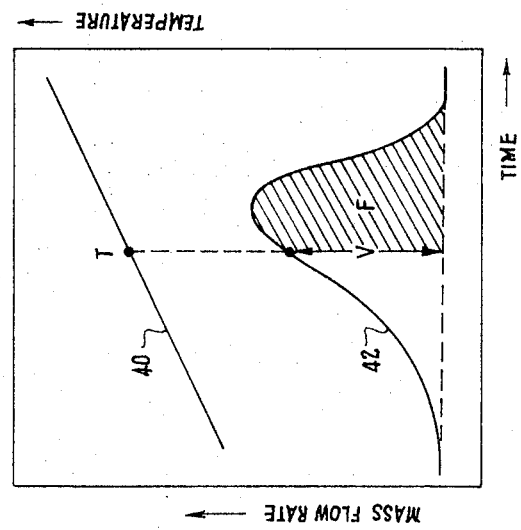
FIG. 2 is a type of reaction curve obtained from the apparatus.

FIG. 2 shows the curves provided by recorder 26 for the thermal decomposition of a substance such as polyester which decomposes via a single first-order reaction. As indicated by curve 40, the temperature of the sample 12 has been increased linearly in time. Curve 42 shows the rate at which the sample evolved vapors during the same time. The total area under the curve 42 represents the total vapor-evolving reaction. At any time during the reaction, when the sample temperature is T and the rate of vapor evolution is V, as shown, the area under curve 42 to the right of that time (shaded and labelled F) represents the proportion of the sample that has not yet decomposed. The specific reaction rate $k$ is then equal to V/F. By selecting convenient points along the time axis and plotting the natural logarithm of specific reaction rate $k$ as a function of the reciprocal of absolute temperature, $1/T$, the compliance of the reaction to an Arrhenius equation (known in the art) can be assessed. Although the temperature curve 40 of FIG. 2 is linear with time, the sample can be heated at varying rates, and the computations of the reaction kinetics can still be made as described. This feature of the invention, together with its ability to use various meters which selectively respond to the evolved vapors (such as water vapor, carbon monoxide, etc.) often provides a much clearer picture of a decomposition reaction than the prior devices provide. For a detailed description of the use of several meters for separating overlapping reactions, reference may be made to my paper "Apparatus for Rate Studies of Vapor Producing Reactions," published in Status of Thermal Analysis, National Bureau of Standards Special Publication 338, pages 137–150, October 1970.

In operating the apparatus, the sample 12 is loaded into the tube 10 and the tube placed in the furnace 18. The meter 36 and recorder 26 are turned on and the pressurized inert carrier gas 28 flowed through tube 10, until the recorder base lines are stabilized and air is flushed from the system. The cracking coil 30 is turned on, and after it reaches orange heat, the furnace is turned on. The furnace temperature is then increased (usually linearly) with time until the pyrolysis is completed, after which the apparatus is deactivated and cooled.

I claim:

1. Apparatus for measuring the rate at which vapors are evolved from materials undergoing thermal degradation, comprising:
    a tube of inert material for holding a sample of the selected material,
    a source of pressurized inert gas connected to one end of said tube,
    means for measuring the mass flow rate of vapors evolved from said sample during heating thereof connected to the other end of said tube,
    a furnace adjacent said tube for heating said sample,
    means introduced into said tube for measuring the temperature of said sample, and
    a cracking coil in said tube between said sample and said other end thereof, for cracking condensable or tarry vapors evolved from said sample, to prevent them from erroneously reducing the reading of said vapor mass flow rate measuring means and from fouling the apparatus.

2. Apparatus as set forth in claim 1, wherein the bore of said tube between said sample and cracking coil is reduced in cross-section, to reduce vapor transit time, thermally isolate the sample from the cracking coil, and assist in loading and retaining the sample in said tube.

3. Apparatus as set forth in claim 1, wherein said cracking coil comprises a coil of electrical resistance heating wire wound on a tube of refractory material and operated at orange heat.

4. Apparatus as set forth in claim 1, wherein said furnace is tubular and surrounds said sample in said tube.

5. Apparatus as set forth in claim 1, wherein the temperature of said furnace is adjustable.

6. Apparatus as set forth in claim 1, wherein said temperature measuring means comprises a thermocouple.

7. Apparatus as set forth in claim 1, wherein means are provided for recording the outputs of said vapor mass flow rate measuring means and said temperature measuring means.

8. Apparatus as set forth in claim 7, wherein said recording means comprises a two-channel potentiometric recorder.

* * * * *